United States Patent
Czaszar et al.

(10) Patent No.: US 8,665,874 B2
(45) Date of Patent: Mar. 4, 2014

(54) METHOD AND APPARATUS FOR FORWARDING DATA PACKETS USING AGGREGATING ROUTER KEYS

(75) Inventors: Andras Czaszar, Budapest (HU); Lars G. Magnusson, Kista (SE); Mats Naslund, Bromma (SE); Lars Westberg, Enköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 392 days.

(21) Appl. No.: 13/128,012

(22) PCT Filed: Nov. 7, 2008

(86) PCT No.: PCT/SE2008/051281
§ 371 (c)(1),
(2), (4) Date: May 6, 2011

(87) PCT Pub. No.: WO2010/053416
PCT Pub. Date: May 14, 2010

(65) Prior Publication Data
US 2011/0274112 A1    Nov. 10, 2011

(51) Int. Cl.
  *H04L 12/28* (2006.01)
  *H04L 12/56* (2011.01)
(52) U.S. Cl.
  USPC .......................................................... 370/392
(58) Field of Classification Search
  None
  See application file for complete search history.

(56) References Cited

U.S. PATENT DOCUMENTS

| | | |
|---|---|---|
| 6,275,492 B1 | 8/2001 | Zhang |
| 6,836,462 B1 | 12/2004 | Albert et al. |
| 2004/0098485 A1 | 5/2004 | Larson et al. |
| 2005/0132060 A1 | 6/2005 | Mo et al. |
| 2006/0059337 A1 | 3/2006 | Poyhonen et al. |

FOREIGN PATENT DOCUMENTS

WO    2007035655 A2    3/2007

OTHER PUBLICATIONS

Rekhter, Y. et al. "Tag Switching Architecture Overview." Proceedings of the IEEE, vol. 85, No. 12, Dec. 1997.
Konish Jr., S. J. "Layer 3 Switching Alternatives." Proceedings of the IEEE Military Communications Conference (MILCOM 98), vol. 1, pp. 287-291, 1998.

*Primary Examiner* — Ayaz Sheikh
*Assistant Examiner* — Blanche Wong
(74) *Attorney, Agent, or Firm* — Coats and Bennett PLLC

(57) ABSTRACT

Method and apparatus for supporting the forwarding of received data packets in a router (402,702) of a packet-switched network. A forwarding table (706a) is configured in the router based on aggregating router keys and associated aggregation related instructions received from a key manager (400,700). Each aggregating router key represents a set of destinations. When a data packet (P) is received comprising an ingress tag derived from a sender key or router key, the ingress tag is matched with entries in the forwarding table. An outgoing port is selected for the packet according to a found matching table entry that further comprises an associated aggregation related instruction. An egress tag is then created according to the aggregation related instruction, and the packet with the created egress tag attached is sent from the selected outgoing port to a next hop router.

23 Claims, 6 Drawing Sheets

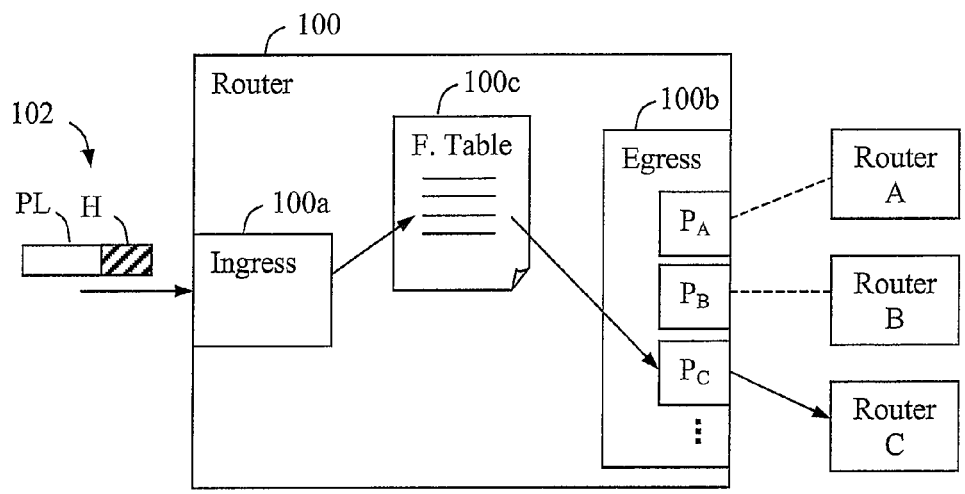
Fig. 1 (Prior art)
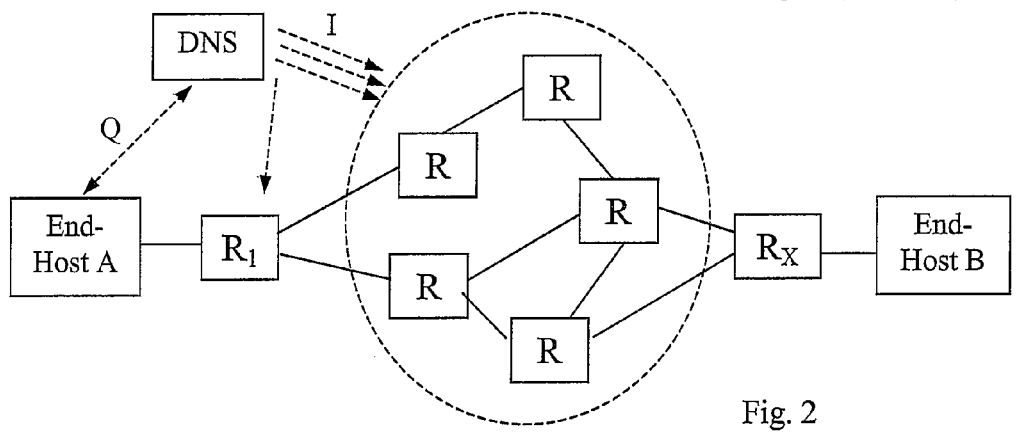
Fig. 2
| Key index (ingress) | Ingress key | Egress key | Key index (egress) | Port | Aggregation related instruction |
|---|---|---|---|---|---|
| ... | | | | | |
| IKi(x) | IK(x) | EK(x) | EKi(x) | P(x) | Agg(x) |
| ... | | | | | |
Fig. 2a

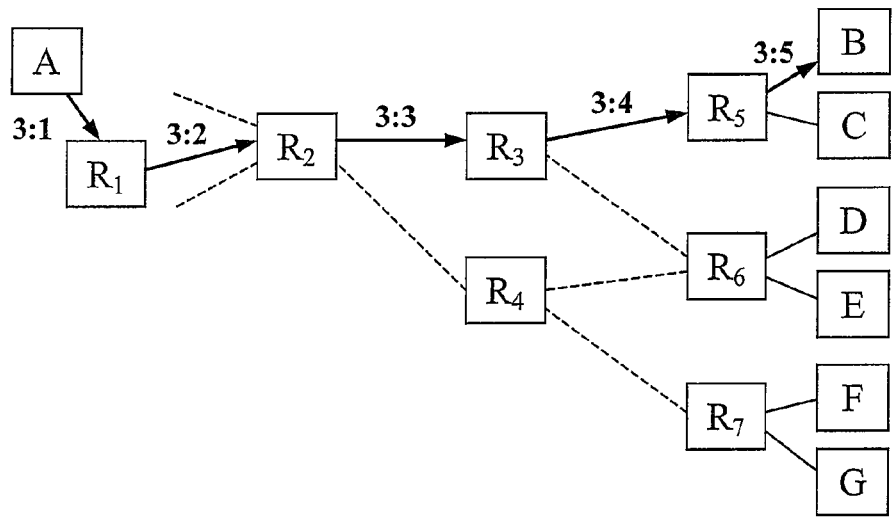
Fig. 3
3:1
| Payload | TAG 1 |
3:2
| Payload | TAG 1 | TAG 2 | TAG 3 |
3:3
| Payload | TAG 1 | TAG 2 |
3:4
| Payload | TAG 1 |
Fig. 3a
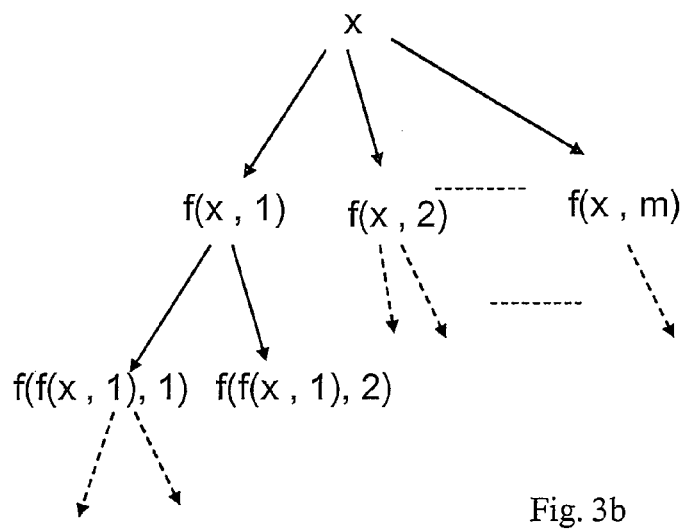
Fig. 3b

METHOD AND APPARATUS FOR FORWARDING DATA PACKETS USING AGGREGATING ROUTER KEYS

TECHNICAL FIELD

The present invention relates generally to a method and apparatus for supporting a forwarding process for data packets in a public packet-switched network such as the Internet, such that unwanted data packets can be avoided.

BACKGROUND

Packet-based transmission of digitally encoded information between different parties over IP (Internet Protocol) networks is used for a variety of communication services, such as e-mail messaging, Internet browsing, voice and video telephony, content streaming, games, and so forth. Digitally encoded information is arranged into data packets at a sending party, which are then transmitted towards a targeted receiving party over a transmission path. The transmission path between the sending party and the receiving party may include various networks, switches, gateways, routers and interfaces. The communicating parties are often referred to as "end-hosts" which may be any type of equipment capable of packet-based IP communication, such as fixed and mobile telephones, computers, servers, game stations, etc. In this description, the term end-host will generally represent any such communication equipment.

An end-host connected to the Internet or other IP network has typically been assigned a forwarding identity in the form of an IP address needed for routing any data packets directed to that end-host along a transmission path. Typically, the end-host has also been assigned a more or less intelligible name in a text string, e.g. a conventional e-mail address or web address, such as user@operator.com, which is associated with an assigned IP address of either the actual user/end-host or some other host receiving messages on behalf of the user. A DNS (Domain Name Server) system comprising a hierarchy of DNS servers is used for retrieving the current IP address of a particular host name. Thus, an end-host can query the DNS system with a host name to communicate with, and the DNS will then reply by providing the current IP address of the corresponding end-host. This type of query is sometimes referred to as a destination query, identity query or address query, the latter being used throughout this description.

Data packets are basically configured with a data field containing payload data and a header field in which the sending end-host inserts the destination address of the target end-host, i.e. the IP address obtained from the DNS system. Thus, each data packet is routed over multiple network nodes, generally referred to as IP routers, along a suitable transmission path based on the destination address in the packet's header field.

In addition to simply receiving and forwarding data packets, an IP router may also be capable of other functions such as security functions, packet scheduling, and translation of addresses and protocols. Further, end-hosts may have a filter/firewall functionality for determining whether incoming data packets should be admitted or discarded, e.g. according to settings typically made by a user or administrator associated with the end-host.

Each router in an IP network typically comprises ingress and egress units acting as interfaces for receiving and sending data packets, respectively. The router also comprises a routing or forwarding function for determining which router an incoming data packet should be sent to as a "next hop" towards the final destination, based on a forwarding table defined in the router. As is well-known in this field, a data packet can often be routed along multiple alternative paths depending on the network topology and the current traffic load.

Links to the "nearest" neighbouring routers are provided in each router by means of corresponding ports, and a forwarding architecture is also configured in the routers based on the distribution of topology information and link information. Each port can have an IP address and an IP mask configured on its interfaces, and routing protocols are used to distribute this information among the routers in the network in a configuring procedure. From the distributed topology information, each router then calculates its own forwarding table, containing multiple destination IP-addresses and associated outgoing ports. As each incoming data packet has a destination IP-address in its header, the forwarding table is used to find the suitable entry in the forwarding table from that IP-address. The main function of the forwarding table is thus to determine the appropriate outgoing port, leading to the next hop router, for each incoming packet.

In FIG. 1, the basic structure of a conventional IP router 100 is shown, when situated in an IP network. Among other things, IP router 100 comprises an ingress part 100a, an egress part 100b and a forwarding function here schematically represented by a forwarding table 100c. The egress part 100b comprises a plurality of outgoing ports $P_A$, $P_B$, $P_C$, ... leading to different neighbouring routers A, B, C, ..., respectively, to which router 100 is directly connected. Any incoming data packet 102 has a payload field PL and a header H, the latter containing the destination address for the packet.

The forwarding table 100c is comprised of multiple entries each containing an IP mask, an IP address and an outgoing port number. The IP mask may be defined in terms of a hexadecimal encoded string such as, e.g., FF.FF.FF.0, or FF.FF.8.0, etc. Briefly described, the destination address in header H is combined with the IP masks in forwarding table 100c by applying a logic "AND"-operation, in order to detect a matching entry with the same IP address. The purpose of this masking mechanism is to aggregate the traffic towards several distinct destinations, and to simplify identification of the outgoing port for the aggregate. Effectively, the bit mask works similar to a "wildcard" when comparing and matching destination addresses to the entries. Once a matching entry is found, the packet can be sent out on the outgoing port according to the port number of that entry.

The incoming data packet 102, which may have been forwarded from a previous router (not shown) to router 100, is thus first received at the ingress unit 100a. It is then determined which next router the packet should be sent to, based on the destination address in header H and using the forwarding table 100c and the above logic "AND"-operation. In this example, the incoming packet 102 has a destination IP address that, when combined with the mask, matches the IP address of an entry in forwarding table 100c having port number $P_C$. The packet 102 is therefore sent out on the corresponding port which is connected to router C, being the next-hop router in this case.

As mentioned above, a routing protocol is used to distribute topology and link information among the routers in an IP network. The currently used routing protocols are configured to obtain "resilience", i.e. packets must be re-routed in a different path in the case of link or node failure in the original path. The routing protocols are also configured to facilitate router management, since configuring routers is typically a cumbersome task which is generally desirable to simplify. Thus, in case of detecting failure in a link or node, the routing protocol will reconfigure the forwarding table in affected routers and at the same time distribute the information to the routers, thereby simplifying the management. In order to obtain scalability, which otherwise is an inherent problem in the routing architecture, the routing process can use aggregation of routes based on the above hierarchical bit-mask scheme, which is well-known in the art and not necessary to describe here further.

However, a major problem in IP-networks and the Internet is that the security support is generally insufficient, as explained below. In a sense, the above mentioned resilience can sometimes make it "too easy" to get across packets through the network. This is because the current routing architecture and protocols were originally designed for a "friendly" environment, i.e. assuming that there are no "illicit" or "corrupt" users communicating in IP networks and that no protection is necessary for the transmission of data packets. Nevertheless, it has been found necessary or desirable to add various security solutions to the IP architecture in order to protect the communicated data, such as IP-sec on a low layer and also TLS (Transport Layer Security) on a higher layer. These protocols can provide authentication and encryption of the data packets. Further, MPLS (Multiprotocol Label Switching) is a solution for building Layer 3 VPNs (Virtual Private Networks) to ensure secure communication. In the VPN case when an intranet is used, private addressing is required and the network is somewhat isolated from the public Internet such that external un-authorized hosts are not allowed to reach and communicate with the hosts attached to the intranet.

Other prior solutions for providing security in the routing protocol include: secure communication between routers such that no illicit entity can eavesdrop, manipulate or imitate a router, the establishment of IP-sec tunnels between router ports to protect the transport of packets between routers, and link security on the layer 2, e.g. according to IEEE 802.1AE or IEEE 802.10. Various authentication procedures using cryptographic keys can also be used, e.g. according to DNS-Sec (DNS Security), HIP (Host Identity Protocol) and CGA (Cryptographically Generated Addresses), to enhance the security. However, while protection against unwanted traffic is used for certain applications (e.g. spam filtering for e-mails), no basic protection against violating end-hosts and unwanted data packets has been generally provided in the public IP infrastructure, though.

Since the internal forwarding identities, i.e. IP addresses, are publicly distributed end-to-end in the manner described above, any end-host is basically able to send messages and data packets to any other end-host over the Internet, resulting in the well-known problems of flooding, spamming, virus, fraud and so-called "Denial-of-service" (DoS) threats. Hence, it has generally become a problem that any end-host can get across data packets totally out of control of the receiving end-host, and that public packet-switched networks such as the Internet have no mechanism in the IP infrastructure for preventing that data packets from potentially illicit or corrupt end-users are routed to the receiver.

More or less complex functionality can be added though at the end-host or in the link layer, such as filters/firewalls or the like, in order to limit the connectivity. However, these solutions are "last line of defence" solutions, meaning that the transport of unwanted data packets can still consume network resources along the entire sender-receiver path, while the packets are anyway discarded at the receiver.

Another problem in communication systems with plenty of end-hosts and multiple routers, is that the forwarding tables in the routers would comprise an enormous number of entries if a security solution is used that cannot employ the above-described bit-masking of IP addresses nor any equivalent thereof, to achieve aggregation of routes. Such large forwarding tables can be very complex to handle, requiring substantial resources for storing, processing and communication, which may typically result in undesirable costs and delays. In particular, if a cryptographic security mechanism is introduced in the routers, the overhead would become even greater, e.g. due to management of cryptographic keys and/or cryptographic processing, thereby making complexity reductions in the routers all the more desirable.

SUMMARY

It is an object of the present invention to address at least some of the problems outlined above. It is also an object to obtain a mechanism for avoiding transmission of unwanted data packets in a packet-switched network, and at the same time be able to use forwarding tables of convenient size in the routers. These objects and others can be achieved by providing methods and apparatuses as defined in the attached independent claims.

According to one aspect, a method is provided for supporting the forwarding of received data packets in a router of a packet-switched network. In this method, a forwarding table is configured in the router based on aggregating router keys and associated aggregation related instructions received from a key manager. Each aggregating router key represents a set of destinations or routes. When a data packet is received comprising an ingress tag derived from a sender key or router key, a matching function is applied to the ingress tag and at least one entry in the forwarding table, the entry comprising a candidate ingress key and an outgoing port indication, in order to find a matching table entry. An outgoing port is selected for the packet according to a found matching table entry that further comprises an associated aggregation related instruction. An egress tag is then created according to the aggregation related instruction in the matching table entry, and the packet with the created egress tag attached is sent from the selected outgoing port to a next hop router.

According to another aspect, an apparatus is provided in a router of a packet-switched network for supporting the forwarding of received data packets. The router comprises a forwarding unit adapted to configure a forwarding table based on aggregating router keys and associated aggregation related instructions received from a key manager, each aggregating router key representing a set of destinations. The router further comprises an ingress unit adapted to receive a data packet comprising an ingress tag derived from a sender key or router key, and an egress unit for sending the data packet to a next hop node.

The forwarding unit comprises a tag matching unit adapted to apply a matching function to the received ingress tag and at least one entry in the forwarding table comprising a candidate ingress key and an outgoing port indication, in order to find a matching table entry. The tag matching unit is further adapted to select an outgoing port for the packet according to a found matching table entry that further comprises an associated aggregation related instruction. The forwarding unit also comprises a tag creating unit adapted to create an egress tag according to the aggregation related instruction in the matching table entry, and to attach the egress tag to the packet which is to be sent by the egress unit from the selected outgoing port to a next hop router.

The above method and apparatus in the router can be configured according to different embodiments. In one embodiment, the matching function includes applying a tag derivation function TDF to the candidate ingress key in a table entry to derive a candidate ingress tag. A match is then considered to be found if the candidate ingress tag satisfies a predetermined relation with the received ingress tag in the packet. The predetermined relation may be equality, i.e. a match is considered to be found if the candidate ingress tag equals the ingress tag in the packet.

In another embodiment, the egress tag is created by applying another tag derivation function TDF' to an egress key in the matching table entry. The received data packet may further contain a key index associated to an entry or a set of entries in the forwarding table, and the key index is used to find the proper entry/entries for applying the matching function.

In further embodiments, the egress tag may be created by attaching one or more additional sub-tags, derived from one or more egress keys in the matching table entry, to the packet alongside the received ingress tag to execute aggregation, or by removing one or more additional sub-tags from the packet to execute de-aggregation. The egress tag may further be created by applying a predetermined combination function to the received ingress tag and the one or more additional sub-tags when executing aggregation. For example, the combination function may be concatenation or an XOR function.

A hierarchical scheme of router keys and destination keys may also be used for executing aggregation of routes. In that case, the egress tag may be created by exchanging the received ingress tag for a new tag derived from an egress key in the matching table entry and also adding associated aggregation information to the egress tag, wherein the aggregation information can be used to determine the original destination.

The hierarchical router key scheme above may be generated from a root value by means of a function f(p,q), where p is the router key value of a node position above a current tree level and q is an integer indicating a node position within the current tree level. Destination keys of end-hosts then correspond to leaves of the tree-structure, and any f-values on one or more tree levels above the leaves can be used as aggregating router keys. The resulting key scheme may be composed of key values that can be calculated, along a path from the root (x) downwards, according to the following chain: (x, f(x), f(f(x)), . . . , f(f( . . . f(x) . . . ))).

According to yet another aspect, a method is provided in a key manager for supporting the forwarding of data packets at routers in a packet-switched network. In this method, destination keys are registered for end-hosts connected to access routers in the network, and the location of routers enabled to execute route aggregation and de-aggregation, respectively, is determined. Aggregating router keys and associated aggregation instructions are also created, each aggregating router key representing a set of destinations. Then, the aggregating router keys and associated aggregation instructions are distributed to the routers for execution of route aggregation and de-aggregation, thereby enabling the routers to configure their own forwarding tables based on the distributed information.

According to yet another aspect, an apparatus is provided in a key manager for supporting the forwarding of data packets at routers in a packet-switched network. This apparatus comprises a network controlling unit adapted to register destination keys for end-hosts connected to access routers in the network, and further adapted to determine the location of routers enabled to execute route aggregation and de-aggregation, respectively. The key manager apparatus further comprises a key distributor adapted to create aggregating router keys and associated aggregation instructions, each aggregating router key representing a set of destinations. The key distributor is further adapted to distribute the aggregating router keys and associated aggregation instructions to the routers enabled to execute route aggregation and de-aggregation, thereby enabling the routers to configure their own forwarding tables based on the distributed information.

The key manager apparatus may further comprise an address query manager adapted to receive an address query from a querying end-host regarding a target end-host. The address query manager is further adapted to create a sender key by applying a key derivation function KDF to at least a destination key associated with the target end-host, and to send the created sender key to the querying end-host in response to the address query. Thereby, the querying end-host is able to get across data packets to the target end-host by attaching a sender tag generated from the sender key to a transmitted data packet, the sender tag directing the transmitted data packet to the target end-host.

Further possible features and benefits of the present invention will become apparent from the detailed description below.

BRIEF DESCRIPTION OF THE DRAWINGS

The present invention will now be described in more detail by means of exemplary embodiments and with reference to the accompanying drawings, in which:

FIG. 1 is a schematic block diagram illustrating a conventional router in an IP network, according to the prior art.

FIG. 2 illustrates a typical transmission path scenario for routing data packets from a sending end-host A to a receiving end-host B, where the present invention can be utilised.

FIG. 2a illustrates a part of an exemplary forwarding table, according to one embodiment.

FIG. 3 illustrates an exemplary network topology and transmission scenario where aggregating router keys are used to support the forwarding process for a packet.

FIGS. 3a and 3b-c, respectively, illustrate two different embodiments of how the final destination address of the receiving end-host can be preserved in the packet of the transmission scenario of FIG. 3.

DETAILED DESCRIPTION

Figure 3C:
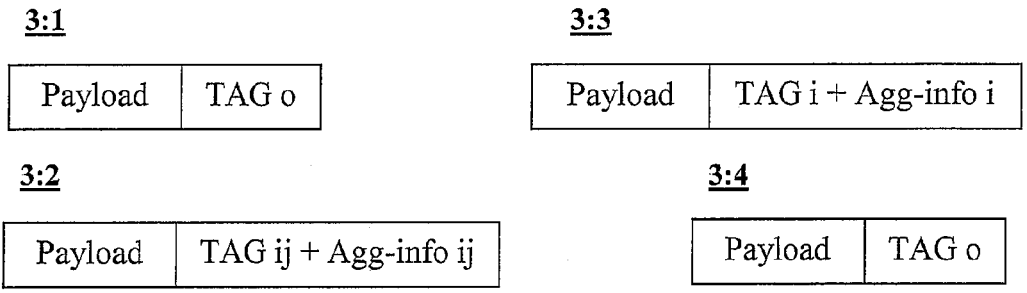

The present invention provides a packet forwarding scheme allowing for aggregation of routes when at the same time end-hosts are protected from receiving unwanted data packets by a security solution in the forwarding architecture that avoids using conventional IP addresses in the address field of transmitted packets. Instead, destination keys, associated with target end-hosts, and preconfigured router keys, associated with the destination keys and the network topology, are used for routing data packets through the IP network. Tags derived from the above destination keys and router keys, are inserted in the headers of the transmitted packets, e.g. in an address field, and the routers can then determine a destination key or router key from the tag in the packet to perform a forwarding operation.

When using such a scheme, the requirement of being able to route packets to the correct destination, and at the same time enabling end-hosts to protect themselves from unwanted packets, would naturally imply the use of destination keys associated to individual end-hosts in all routers and corresponding entries in the forwarding tables. As a result, aggregation of routes cannot be obtained in the conventional manner as when a regular IP addressing scheme is used.

Instead, aggregation of routes is obtained by attaching tags in the transmitted packets which are derived from special aggregating router keys that represent a set of plural routes or destinations. Such tags can then be changed, added to or removed from the packet by a router according to an aggregation related instruction in a matching entry in the router's forwarding table, to execute aggregation or de-aggregation, respectively, in that router. Thereby, the size of forwarding tables in the routers can be reduced by including such aggregating router keys, as compared to not employing aggregation of routes in the routers where a table entry is provided for each and every end-host in the network. In this description, "aggregation" implies routing towards an increased number of destinations and "de-aggregation" implies routing towards a reduced number of destinations.

An exemplary transmission scenario is schematically illustrated in FIG. 2, with the following nodes basically involved when transmitting data packets through a network with routers R, in accordance with embodiments described below: A sending end-host A connected to an access router R1, a plurality of intermediate routers R that may potentially be used in the transmission path, and an access router Rx to which a receiving end-host B is connected, access router R1 thus being a "first-hop router" and access router Rx being a "last-hop router" in the network. A DNS server system is also used for handling address queries Q and for generally distributing routing information I to the routers. In the following description, the term "key manager" is used to generally represent a DNS system or any other similar functional unit or system.

According to embodiments to be described below, a security solution can be built into the core protocol of the forwarding architecture used by routers in the network. Generally, any packets transmitted over a public packet-switched communication network must pass the forwarding mechanism in the forwarding plane of the routers in the transmission path, e.g. as described above. By embedding a packet forwarding control mechanism within the forwarding plane in a router, to be described below, the resulting security will effectively be enforced in the IP infrastructure to control the routing of any packet passing that router.

Briefly described, predefined implicit destination keys, associated with target end-hosts, and preconfigured router keys, associated with the destination keys and router positions in a network topology, are used instead of explicit IP addresses for routing data packets through the IP network. A key manager thus registers such destination keys for end-hosts, being potential receivers of data packets. In this process, the destination keys may be assigned by the key manager or selected by the end-hosts, depending on the implementation.

The key manager will then provide a corresponding sender key rather than an IP address in response to an "address query" or the like from a querying end-host for a target end-host. In this description, the term "address query" should be understood as any query for information that can be used for authorising communication of data packets to the target end-host.

The key manager creates the sender key by applying a "Key Derivation Function KDF" to at least the destination key of the target end-host and optionally also to the identity of the querying end-host, to be described in more detail below. Alternatively, the sender key may be created by applying a KDF to another key being related to the destination key and possibly also to destination keys of other end-hosts to obtain aggregation of plural routes or destinations. The destination key of the target end-host is thus effectively "concealed" in the sender key provided to the querying end-host. This can be obtained by using a one-way function or hashing function as KDF.

The querying end-host then further derives a sender tag from the obtained sender key by applying a "Tag Derivation Function TDF" to the sender key, and attaches the sender tag in the header of each transmitted data packet of at least an ongoing data flow or session with the receiving target end-host. The sender tag thus implicitly encodes the destination key of the target end-host. Alternatively, the key manager may derive the sender tag and deliver it directly to the sender. The TDF may likewise be a one-way function or hashing function.

Further, the key manager creates different router keys, based on the registered destination keys and the network topology, and distributes the router keys to routers in the IP network to form a basis for creating forwarding tables in the routers. It is further determined which routers can execute route aggregation or de-aggregation, respectively, depending on their positions in the network topology. Different criteria can be used for deciding where aggregation/de-aggregation should be executed in a network topology. One way is to use the table-size as an indicator of the need to perform aggregation. However, various other methods can also be applied to determine the placement of aggregation/de-aggregation which is out-of-scope of this description. A hierarchical tree-like topology of the router network may in some cases also be determined, such that the routers are positioned at different hierarchical levels in the topology.

By having detailed knowledge of in which routers aggregation or de-aggregation can be executed, and also the network location of each end-host for which a destination key has been registered, the key manager can create "aggregating router keys", i.e. keys that represent sets of plural destinations and can be used for routing in routers at different hierarchical levels in the network topology. These aggregating router keys are thus distributed to the appropriate routers, e.g. in a configuring procedure.

The routers can then configure their own forwarding tables by means of the distributed router keys. As indicated above, the router keys are created based on the location of routers in network where aggregation or de-aggregation can be executed, wherein at least some of the distributed router keys are aggregating router keys associated to a group of plural destinations or routers in the network, in order to reduce or limit the number of entries in the forwarding table in the routers.

The key manager further defines and distributes an aggregation related instruction associated with each aggregating router key, to be included in a policy field or the like of any forwarding table entries containing an aggregating router key. This instruction basically tells the router if and how to execute aggregation or de-aggregation, e.g. by changing an existing router tag in the packet, or by adding or removing one or more router tags to/from the packet, respectively, according to different possible embodiments which will be described in more detail below.

Optionally, the key manager may also distribute key indexes for inclusion in the forwarding tables, each key index being associated to one or more rows in the table with different router keys, in order to facilitate the forwarding operation in a manner to be described below. In practice, the key manager can basically assign a key index to each router key.

Thus, the forwarding table in a router has entries with router keys, corresponding outgoing ports and optional key indexes. The table entries with aggregating router keys also contain an associated aggregation related instruction in a policy field or the like, basically dictating that the router should perform aggregation or de-aggregation, as mentioned above.

In this description, the tag in an outgoing or forwarded packet is generally referred to as an "egress tag" derived from an "egress key", whereas the tag in an incoming or received packet is referred to as an "ingress tag". Further, an "ingress key" is the key from which the received ingress tag has been derived.

In the forwarding operation performed by a router having received a data packet containing an ingress tag, the ingress tag is matched with the ingress keys in the forwarding table by using a predetermined TDF, e.g. entry by entry, and when a matching entry is found the corresponding outgoing port in that entry is selected for sending out the packet. The router further checks if the matching table entry contains an aggregation related instruction, e.g. dictating that the router should change the received router tag, or add or remove one or more router tags to/from the packet, to be described below. An egress tag, e.g. derived from an explicit egress key in the matching table entry or derived according to an associated aggregation related instruction, is thus attached to the packet header before sending out the packet on the outgoing port to the next-hop router.

If no matching entry is found in the table, the packet may be handled according to a predefined "default policy", e.g. dictating that the packet is discarded and not forwarded any further. The router will typically employ such a policy if some unauthorized sending end-host, not knowing the appropriate key, tries to get across a data packet with a "faked" tag inserted.

When the packet is received by the next-hop router, the process above will basically be repeated. If key indexing is used, a key index in the ingress tag of the received packet will point directly to one entry, or to a limited set of entries, in the forwarding table, thereby identifying the ingress key(s) in the entry/entries. The router can then limit the matching operation above to the ingress key(s) identified by the key index.

In this way, by not exposing the destination/sender/router keys to unauthorized parties, interception of explicit end-host addresses or identities that can be used by others to get across data packets, is not feasible. As a result, unsolicited data packets to those end-hosts can be essentially avoided, unless a valid key or tag can be correctly "guessed" by an unauthorized party which is most unlikely. The sender and router keys and optional key indexing are thus useful in the forwarding operation performed by routers in the transmission path, in a manner to be described in more detail below with reference to specific exemplary embodiments. Further, by populating the forwarding tables with aggregating router keys that represent a group of destinations, and with associated aggregation related instructions, the forwarding operations can be made more effective and the forwarding tables will be of limited size and not too large, particularly in networks with numerous end-hosts and routers.

Basically, when an aggregating router key has been used to generate an egress tag at a certain router, the routing task of subsequent routers is simplified. However, as the packet is transferred closer to its destination, aggregation may at some point not be possible any more. On the other hand, the number of potential destination/routes will at that point also begin to diminish, maintaining the effectiveness of the routing.

FIG. 2a illustrates a forwarding table that can be used in the present solution, in which an exemplary entry or table row is denoted "x". The table has plural columns 200-210 comprising an optional first column 200 with an ingress key index "IKi" that can be used for finding one or more appropriate entries for executing the matching operation, i.e. matching an ingress tag attached to an incoming packet with an ingress key "IK" present in a second column 202 in the table. A single ingress key index may point to a set of multiple entries in the table to which the matching operation can be limited.

A third column 204 may contain one or more egress keys "EK" from which one or more new egress tags are to be created, once a matching entry is found, for inclusion in the packet when forwarded to the next-hop router. An optional fourth column 206 contains an egress key index "EKi" to be attached to outgoing data packets, which will effectively be used as the ingress key index when received by a next-hop router. A fifth column 208 contains a port number "P" indicating the port on which a received and matched packet is to be sent out towards the next-hop router.

Finally, if an aggregating router key is used as ingress or egress key, a sixth column 210 contains an aggregation related instruction "Agg" associated with the aggregating router key, basically dictating that the router should execute aggregation or de-aggregation and also how the new egress tag should be created, to be described below. Column 210 may be referred to as a "policy field" which may also contain various other data such as policy rules or the like, e.g. "drop packet", "use default port", "retrieve new router key from DNS", "request previous hop router to explicitly authenticate itself", and so forth. If key indexing is not used, the optional columns 200 and 206 will naturally be omitted.

An exemplary network topology and transmission scenario where aggregating router keys are used to support a forwarding process, is schematically illustrated in FIG. 3. A plurality of routers are interconnected according to a known network topology, in this case greatly simplified, and a plurality of end-hosts are connected to access routers in the network.

In this figure, only some of the routers R1-R7 and end-hosts A-G are shown, while a real network has typically a much greater number of end-hosts and routers than illustrated here. The routers R1-R7 have configured their own forwarding tables from previously distributed router keys and aggregation related instructions, etc, determined from the network topology and destination keys defined for the end-hosts A-G, as described above.

In this example, a first end-host A being connected to an access router R1, sends a data packet to R1 in a first hop 3:1, destined to another end-host B being connected to an access router R5. End-host A has attached a sender tag to the packet which has been derived from an obtained sender key associated with the destination end-host B in the manner described above, thus associated exclusively to end-host B. The receiving router R1 then matches the router tag in the packet with entries in its forwarding table to determine an outgoing port that leads to router R2 as the next-hop router.

It can be seen from the network topology of this figure that all packets that are destined to any of end-hosts B-E, can be forwarded in router R2 by an aggregating router key that is associated to router R3 as the next hop, since R3 can forward packets to all of B-E. On the other hand, packets destined to end-hosts F and G should be forwarded in router R2 by another aggregating router key that is associated to router R4 instead. In this description, a router key that is said to be "associated" to a particular router is to be generally understood as a key that matches a forwarding table entry with an outgoing port number providing a path to that router.

However, it should be noted that in the forwarding tables, there is not necessarily a one-to-one correspondence between which egress key and port to use. In fact, a plurality of next-hop routers may be available to forward packets towards a certain set of destinations "S". For instance, in the example of FIG. 3, router R2 could forward packets to D or E via either R3 or R4. Thus, more than one port may be used in router R2 to forward any packets containing an egress tag derived from one and the same egress key associated to destinations in set S. For example, local congestion conditions may dictate the use of a particular outgoing port regardless of the egress key value.

In this example, the table entry in R1 that matches the sender tag in the present received packet contains an aggregation related instruction dictating that aggregation towards R3 should be executed by router R1. However, the aggregation can be done in other ways, e.g. by the sending end-host A aided by a key manager or by another router in the transmission path. The aggregation related instruction in the matching table entry at router R1 thus dictates that aggregation should be executed by attaching a new egress tag to the packet which has been derived from an aggregating router key merely associated to router R3 and not to the more detailed destination of end-host B, hence the aggregation. However, the detailed destination of end-host B must somehow be preserved in the packet for later use, which can be done in different ways as described later below. Router R1 then sends the packet with the new tag attached, to the determined next-hop router R2 in a second hop 3:2.

When receiving the packet from router R1, router R2 can match the attached tag with entries in its forwarding table to determine an outgoing port that accordingly leads to router R3. Before sending the packet further to router R3, router R2 should execute de-aggregation, i.e. according to an aggregation related instruction found in the matching table entry at router R2, by changing the tag in the packet such that the tag used by the next router R3 to forward the packet is derived from a router key that is associated to router R5. Router R2 then sends the packet to router R3 with the changed tag attached, in a third hop 3:3.

Alternatively, Router R2 may send the packet to router R3 without changing the tag in the packet, wherein router R3 can deduce from the attached tag that the packet should be sent to router R5. Yet another alternative is that R2 executes de-aggregation by simply removing the tag pointing to R3 and leaving only the original tag associated directly to the destination B.

When receiving the packet from router R2, router R3 matches the attached tag with entries in its forwarding table to determine an outgoing port that accordingly leads to router R5. Moreover, according to an aggregation related instruction found in the matching table entry, router R3 executes further de-aggregation by changing the tag in the packet such that the tag used by the next router R5 to forward the packet is derived from a router key that eventually is associated to end-user B.

Router R3 then sends the packet to router R5 with the changed tag attached, in a fourth hop 3:4. Since the tag in the packet is derived from a router key now associated to the final detailed destination address of end-user B, de-aggregation has been completed and the packet is therefore finally sent from router R5 to end-host B, in a final fifth hop 3:5.

In the example above, a two-level aggregation was executed at router R1 by attaching a tag derived from a key that merely is associated to router R3, and a one-level de-aggregation was executed in each of routers R2 and R3 by attaching tags derived from keys associated to router R5 and to end-host B, respectively. Thereby, the number of table entries can be reduced at least in routers R2 and R3 to provide for forwarding operations based on tags derived from aggregating router keys in the manner described above.

In this context, a "two-level aggregation" basically implies using a router key associated to a plurality of destination groups, while a one-level de-aggregation implies changing that router key to a router key associated to a single destination group. Further, when no aggregation is made, i.e. a "zero-level aggregation", a router key is used associated to a distinct destination, e.g. end-host. Generally expressed, a "k-level aggregation" implies using a router key associated to a group of plural (k−1)-level aggregated destinations. The term "k-level aggregating" implies changing the router key to a router key associated to a k-level aggregated set of destinations.

Reducing the number of table entries should be understood in relation to the alternative where each router maintains keys for all possible destinations handled by that router. For example, router R3 will only need to use 2 aggregating keys for routing associated to R5 and R6, respectively, as opposed to 4 keys covering all 4 possible destinations B-E.

However, any other aggregation and de-aggregation schemes can be used, depending on the network topology and location of the sending and receiving end-hosts. For example, a transmission path may comprise any number of intermediate routers between access routers of the sending and receiving end-hosts, and any level of aggregation may be executed, either step-wise in plural successive routers along the path, or preferably by introducing multiple levels of aggregation at a single router. Further, it may not be necessary to execute aggregation nor de-aggregation at all in some router(s) in the path, which is controlled by aggregation related instructions in the matching table entries as described above. In the case of a hierarchical network topology, aggregation "upwards" in the hierarchy is first executed for the packet "early" in the transmission path, and de-aggregation "downwards" in the hierarchy is then executed "later" in the path.

Common for all these aggregation schemes is that the aggregation of routes is made to reduce the forwarding table size, while de-aggregation must be done for a transmitted packet to enable identification of its eventual destination. One skilled in the art will realise that many different methods can be applied to identify which router positions in the network topology are "most suitable" for executing the aggregation/de-aggregation, which is however outside the scope of this description.

It was mentioned above that when aggregation is executed, the final destination address of the receiving end-host must be preserved in the packet. If a tag generated from an aggregating router key, e.g. associated to a set of destinations, were otherwise to simply replace a tag generated from a key associated exclusively to a single destination, the correct destination would, from this point on, be impossible to identify.

Two different embodiments of how this can be done in the transmission scenario of FIG. 3 will now be described in more detail with reference to FIG. 3a and to FIGS. 3b and 3c, respectively. Even though these embodiments refer specifically to the transmission example and network topology of FIG. 3, one skilled in the art will readily understand how to generally apply the described mechanisms and schemes in other transmission scenarios and network topologies.

In the embodiment illustrated by means of FIG. 3a, route aggregation is executed by combining the original tag attached to the packet by the sending end-host A with various added tags derived from aggregating router keys each effectively associated to plural end-hosts at different levels. In this embodiment, an ingress tag of a received packet may thus be composed of plural "sub-tags" when one or more levels of aggregation have already been made by previous routers, while the original tag is maintained in the packet as an "innermost" tag. Each packet-receiving router is then preferably obliged to use the "latest" or "outmost" tag to determine the next hop, i.e. matching that tag with candidate ingress keys in the forwarding table. If no match is found for the outmost tag, the router may try the next tag, and so forth. If no match is found for any sub-tag, the packet may be discarded or routed according to a default routing policy.

When multiple tags are used in this manner to compose a total ingress or egress tag, it should be indicated where to find each individual sub-tag within the packet. For instance, each sub-tag may start with a "bit-offset" or the like, indicating where the next tag can be found and the last tag may then have a zero-offset to indicate "no further tags" or similar. Another possibility is to use a predetermined fixed size for the sub-tags known in beforehand to the routers. In any case, tags can be added in a header of the packet, or, as exemplified in the figures, in a "tail" or "trailer" of the packet.

FIG. 3a shows the packet with a payload field and different tags attached at the different hops in the transmission scenario of FIG. 3. Thus, when end-host A sends the packet to the first-hop router R1 in hop 3:1, only the original tag denoted "TAG 1" is attached thereto, derived from a destination key that is associated exclusively to end-user B.

When router R1 sends the packet to the next router R2 in hop 3:2, two additional sub-tags denoted "TAG 2" and "TAG 3" have been attached to the packet alongside the original tag, where TAG 2 is placed next to TAG 1 and TAG 3 is placed next to TAG 2. Router R1 has derived TAG 2 and TAG 3 from respective aggregating router keys according to the aggregation related instruction in the matching table entry. TAG 3 is the packet's latest or outmost sub-tag representing the highest level router key with respect to aggregation, in this case associated to router R3, and should therefore be used by the packet receiving router R2 to find the next-hop router R3.

When router R2 has found router R3 based on TAG 3, de-aggregation is executed by removing the outmost sub-tag TAG 3 from the packet, leaving TAG 2 as the outmost sub-tag associated to router R5 when the packet is sent to R3 in hop 3:3. Likewise, when router R3 has found router R5 based on TAG 2, a further de-aggregation step is executed by removing the outmost sub-tag TAG 2 from the packet, leaving the original TAG 1 associated exclusively to end-host B when the packet is sent to R5 in hop 3:4.

Generally speaking, the ingress tag of a received packet is changed in this embodiment by attaching one or more additional sub-tags, derived from one or more egress keys in a matching table entry, to the packet to execute aggregation, whereas the total ingress tag is changed by removing the additional sub-tags from the packet, one by one, to execute de-aggregation.

In the description above for FIG. 3a, it is assumed that the added TAG 2 and TAG 3 are simply concatenated successively with the original TAG 1 to create a new egress tag. However, it is possible to add these sub-tags in a more integrated manner such that a new egress tag is formed by a combination of the original TAG 1 and the added TAG 2 and TAG 3. In the general case, a predetermined combination function "C" can be applied to the received ingress tag and one or more tags derived from one or more egress keys of a matching table entry. The function C may be concatenation, as described above, or some other function, e.g. the known logical "XOR" function. If n egress keys are found in a matching table entry, this can be generally expressed as:

$$\text{new egress tag} = C(\text{ingress tag}, \text{TDF}(\text{egress key}_1), \text{TDF}(\text{egress key}_2)\ldots, \text{TDF}(\text{egress key}_n)) \quad (1)$$

It should be noted that while this approach can be used to save communication bandwidth, it also makes the matching operation more complex. For instance, in a forwarding table with N ingress keys, to process an ingress tag combined by 3 XOR:ed tags, roughly N^3 possible ingress key combinations may need to be considered. At the same time, the need for bandwidth is roughly reduced threefold.

As described above, when a matching table entry is found, a new egress tag is created for the packet according to the aggregation related instruction in the matching table entry. For example, this instruction may dictate any of the following:

Apply the matching function to the "next" tag even if a match has already been found for an outmost tag, Use one or more egress keys in the matching table entry to generate one or more additional sub-tags for the packet to execute aggregation, Remove zero or more sub-tags before attaching the new egress tag as the outmost sub-tag to execute de-aggregation.

Apply a combination function C (e.g. concatenation, a logical XOR-operation, etc.) to a received ingress tag in the packet and one or more egress keys in the matching table entry to execute either aggregation or de-aggregation.

When using the tag combination function of (1), adding a tag could in fact potentially mean either "aggregate" or "de-aggregate", depending on whether the key used to produce the added sub-tag represents a larger or smaller set of destinations. Thus aggregation/de-aggregation may be implicit from the "type" of egress key used. Further, it can sometimes be assumed that the very first router in the path has sufficient knowledge to perform all aggregation levels at once, as router R1 in the example above, such that only de-aggregation will take place in subsequent routers.

In the above embodiment exemplified by FIG. 3a, once the network topology and aggregation/de-aggregation points have been determined, each destination or group of destinations could technically be assigned random, independent destination and router keys, to be distributed to appropriate routers. However, it is possible to reduce the number of keys that need to be explicitly distributed and managed, which is shown in the other embodiment illustrated jointly by means of FIGS. 3b and 3c. In this embodiment, a hierarchical scheme of router keys and destination keys is used for executing aggregation of routes at different levels by exchanging the original tag, attached to the packet by the sending end-host A, for a new tag derived from an aggregating router key. A piece of associated aggregation information is also added to the tag, that can be used to determine the original destination.

FIG. 3b shows an example of how such a hierarchical key scheme with nodes at different levels of a tree structure can be generated from a root value x by means of a function f(p,q), where p is the router key value of a node position above in the tree and q is an integer indicating a node position within the current tree level. The resulting key scheme will then be composed of key values that can be calculated, along a path from the root downwards, according to the following chain: (x, f(x), f(f(x)), ..., f(f( ... f(x) ... ))), and so forth.

The destination keys of individual end-hosts in the network have key values at nodes right at the bottom of this tree structure, forming "leaves" on the tree.

It should be noted that the tree structure should not be understood as reflecting a physical network topology, but it should in general be viewed as a logical overlay on the physical network. In particular, all leaves are not necessarily "occupied" by a physical end-host. Moreover, while the higher-level (non-leaf) keys intuitively correspond to intermediate nodes in the network, i.e. routers, all intermediary nodes are not necessarily actually associated with physical routers. For instance, a certain router R could handle a sub-set of the keys, e.g. corresponding to a sub-set of the tree, and so forth.

From the value of f(p,q) of any node in this tree-structure, the entire sub-tree of f-values below that node can be easily generated. Assuming that destination keys of end-hosts correspond to leaves of the tree-structure, any f-values on one or more tree levels above the leaves can be used as aggregating router keys. Thereby, a cryptographic tree structure of keys can be superimposed on any hierarchic router topology. In one possible embodiment, the function f may be a one-way function which is easy to compute "forwards" but difficult to compute "backwards", i.e. to "invert" the function. Although the tree structure shown in FIG. 3b is binary, it is possible to use any "n-ary" or other tree structure to generate router and destination keys, and the present embodiment is not limited in this respect.

Thus, by distributing a single key value to a router, the entire (sub-)tree below that key value can be re-constructed locally by the router, without explicitly distributing any additional key(s). On the other hand, it may be a security advantage that keys associated to "higher level" routers (which may conceptually be more "important" routers) cannot be deduced from keys associated to "lower level" routers or end-hosts.

Aggregation is executed by moving "upwards" in the tree structure to select a new egress key for the packet, while de-aggregation is done by moving "downwards" in the tree to select a new egress key. Thus, when aggregation is executed for a packet by attaching a tag derived from a new key one or more tree levels above the previous key, the added aggregation information should basically indicate at which branch the previous key was located. In the case of a binary key tree structure, this information may simply be either "left" or "right" for each aggregation level. In the general case of a n-ary key tree structure, this information would comprise an integer between 1 and n for each aggregation level.

For example, if a router has found a match for a key k=f(x, 1) in its forwarding table and should de-aggregate towards the destination by moving downwards in a tree from the node f(x,1), according to an associated aggregation related instruction in the forwarding table, it must be determined whether de-aggregation should be made towards f(f(x,1),a) or towards f(f(x,1),b), since f(x,1) is a common root of both. This can be solved by adding associated aggregation information at each aggregation step, as indicated above.

Thus, if an aggregating router earlier in the transmission path exchanges a tag generated by f(f(x,1),a) by one generated by f(x,1), the router can add "a" to the tag as aggregation information. This information "a" will enable a de-aggregating router later in the transmission path to de-aggregate from f(x,1) towards f(f(x,1),a), and not towards f(f(x,1),b). In general, each aggregation step will thus expand the tag size with one piece of aggregation information.

As mentioned above, if the function f is a one-way function, it is not possible to compute "upwards" in the tree structure to execute aggregation, although it is relatively easy to compute "downwards" in the tree structure to execute de-aggregation. This can be solved as follows. Assuming that a router in the network has some "highest" level of aggregation that it should perform, a key can be distributed to that router located at a node position high enough in the tree to enable the router to compute any node value in a sub-tree below that highest node position to produce an aggregating router key. Thus, if a router is given a key corresponding to the root of a sub-tree, and also knowing the function f, it can compute all node values in the entire sub-tree below the given root key for aggregation of the corresponding destinations.

FIG. 3c shows the packet with a payload field and different tags attached at the different hops in the transmission scenario of FIG. 3, in this case using the hierarchical router key scheme of FIG. 3b. In this example, a tag in a received packet is also exchanged for a new tag derived from an aggregating or de-aggregating router key as follows. As in the embodiment of FIG. 3a, only the original tag denoted "TAG o", derived from a destination key that is associated exclusively to end-host B, is attached to the packet sent from end-host A to the first-hop router R1 in hop 3:1.

When router R1 sends the packet to the next router R2 in hop 3:2, a new tag "TAG ij" is attached to the packet derived from a two-level aggregating router key according to an aggregation related instruction in the matching table entry. "TAG ij" is derived from a router key associated to router R3, which thus can be used by the packet receiving router R2 to find the next-hop router R3. Additional aggregation information "Agg-info ij" is also attached to the packet alongside "TAG ij" indicating how the aggregation was made for two levels i and j, respectively, thereby enabling de-aggregation towards the correct key in routers further down the transmission path.

As described above, aggregation information "a" can generally be added to the new tag enabling de-aggregation from f(x,1) towards f(f(x,1),a). In this case, "Agg-info ij" indicates a two-level aggregation such that de-aggregation can be executed in two following routers for levels i and j, respectively. Specifically, "Agg-info ij" would indicate that the path from the key associated to R3 leads to B via R5. In this binary tree example, two "left" branches should be followed from R2 when executing de-aggregation according to "Agg-info ij".

When router R2 has found router R3 based on "TAG ij", de-aggregation is executed by exchanging "TAG ij" for a new tag "TAG i" associated to router R5 when the packet is sent to R3 in hop 3:3. Also, new aggregation information "Agg-info i" associated with the new tag is also attached to the packet alongside "TAG i" indicating how the aggregation was made for level i, i.e. that the "left" branch should be followed in the next hop 3:4. Likewise, when router R3 has found router R5 based on "TAG i", a further de-aggregation step is executed by exchanging the previous "TAG i" for the original "TAG o" associated exclusively to end-host B when the packet is sent to R5 in hop 3:4.

Generally speaking, aggregation is executed in this embodiment by exchanging a tag in a received packet for a new tag, being derived from an aggregating router key according to the aggregation instructions, and also attaching additional associated aggregation information indicating how the aggregation was made. On the other hand, de-aggregation is executed by exchanging a tag in a received packet for a new tag determined based on the additional aggregation information in the packet.

While the embodiment of FIGS. 3b-c above is based on a hierarchical key structure, it is possible to use either a "flat" key structure with more or less randomly generated key values, or a hierarchical key structure as described above, in the embodiment of FIG. 3a. Further, these two embodiments can also be used either separately or in conjunction.

If a matching table entry is found for the received ingress tag, a new egress tag is created for the packet according to the aggregation related instruction in the matching table entry. Assuming that a certain key value k in the key tree has resulted in a match, this instruction may dictate any of the following:

Execute aggregation by using a key at a certain level "above" k in the tree to produce the new egress tag. This also typically implies adding aggregation information in the case of a hierarchical key structure.

Execute de-aggregation by using a key at a certain level "below" k according to the additional aggregation information in the packet, to produce the egress tag.

Execute neither aggregation nor de-aggregation. The new egress tag may in this case be generated either using the same key k, or an explicit egress key in the matching table entry. This key may be part of another key tree, generated as part of some other key tree, e.g. for routing between different administrative domains where each domain would typically have distinct key trees.

The aggregation/de-aggregation scheme used could also be implicit by simply configuring the forwarding tables in the routers with appropriate egress keys according to the key hierarchy described above.

The aggregation mechanisms above can also be further understood by considering an analogy from the transmission of a physical letter by ordinary post mail. The detailed destination address is originally presented on the letter typically including a street address, city and country, effectively forming a hierarchical addressing scheme. For example, a letter may be sent from Texas in the US to 17 Main Street, Stockholm, Sweden. The receiving post office in Texas will immediately see that the letter is directed to Sweden, but will not need to read the more detailed information of street address and city. This could mean that the letter is first sent to an international post terminal in New York which sends all outgoing post destined to Sweden, to an international post terminal of Gothenburg in Sweden.

Initially, two levels of aggregation have thus been made by only reading the country in the address to determine the "next hop" for the letter, discarding the levels of both city and street, respectively. Referring to FIG. 3, router R1 may thus be equivalent to the post office in Texas, router R2 may be equivalent to the post terminal in New York, while router R3 may be equivalent to the post terminal in Gothenburg, Sweden, and so forth. More detailed information in the address of the letter will then be read in Gothenburg and Stockholm, respectively, as a result of gradual de-aggregation. In this context, the need for multiple tags and/or path information in the key tree can also be understood as follows. The analogy for not using multiple tags would be that the post office in Texas, only being interested in the country of destination, would in that case erase street/city from the address and only keep "Sweden" before forwarding the letter. While the letter would reach Sweden, it would not be possible to "route" the letter any further towards the destination.

Figure 4:
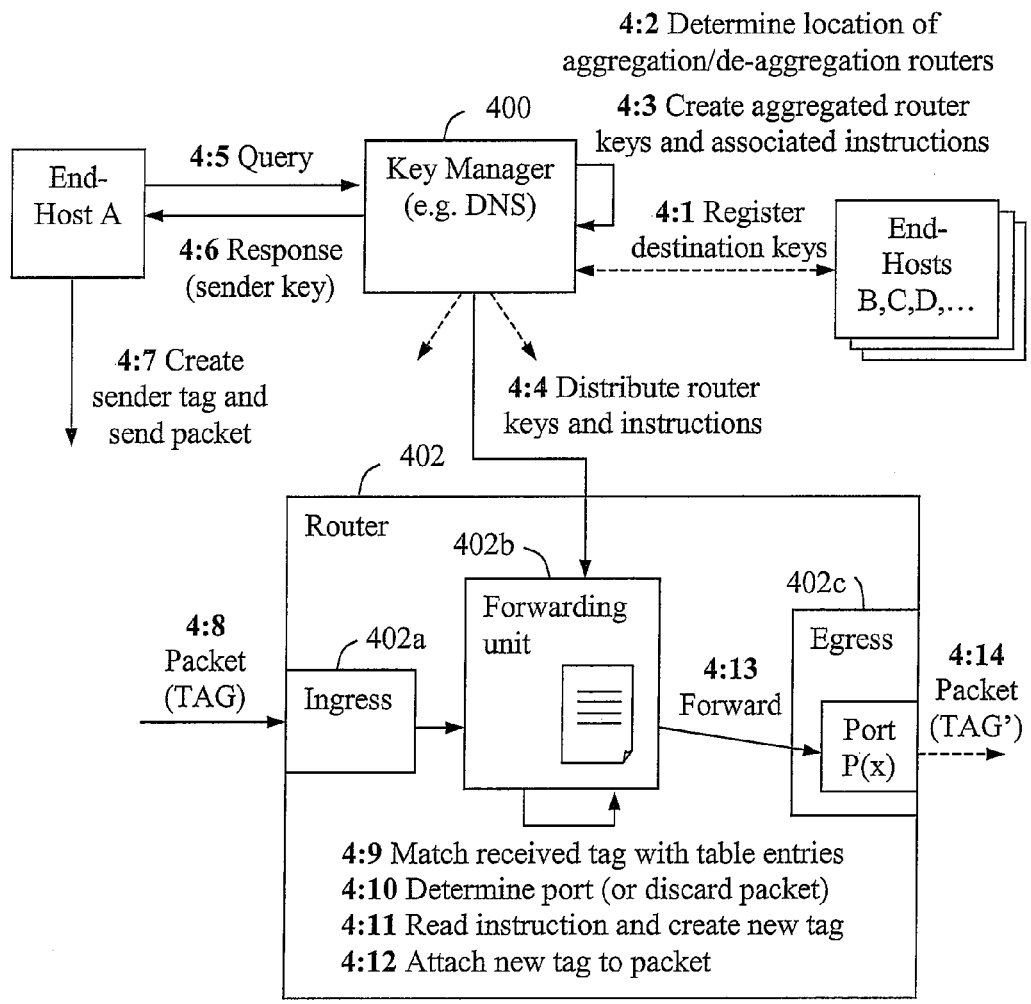
FIG. 4 is a block diagram illustrating how aggregation can be used in a router when forwarding a data packet sent from an end-host A, according to further embodiments.

FIG. 4 is a block diagram illustrating how the forwarding of a data packet, sent from an end-host A towards a target end-host, not shown, can be supported in a packet-switched network, according to some further exemplary embodiments. This procedure is shown as a series of actions or steps mainly involving end-host A, a key manager 400 and a router 402 somewhere in the transmission path between end-host A and the target end-host. In this example, router 402 employs aggregation of routes as described below.

In a first step 4:1, destination keys associated with various end-hosts B,C,D, . . . are registered and stored in the key manager 400, where each unique destination key actually identifies or "defines" a corresponding destination, i.e. end-host. In this process, a destination key may be settled in agreement between the end-host and the key manager 400, preferably after authenticating the end-host. Effectively, this step can substitute the assignment of IP addresses to end-hosts according to the prior art.

Key manager 400 also determines the location of routers that can execute aggregation and de-aggregation, respectively, in a step 4:2. Various different ways can be conceived to determine the location of aggregation and de-aggregation in the network topology, e.g. dependent on forwarding table size, and/or by determining a hierarchical network structure, the location of end-hosts, and so forth, which is however not necessary to describe here further. Key manager 400 further creates aggregating router keys and associated aggregation related instructions from the above registered destination keys, in a next step 4:3. As mentioned above when describing FIG. 2a, a key index may also be defined for each created router key. The destination keys and router keys may be arranged in a hierarchical or "flat" key structure, which may however impose different aggregation schemes as described above.

Then, key manager 400 generally distributes the created aggregating router keys with associated aggregation related instructions and optional key indexes, to routers in the network where aggregation can be employed, including the router 402 shown here, in a further step 4:4. Key manager 400 may also distribute non-aggregating router keys and destination keys to some of the routers, which is however not considered in this description. The routers are then able to configure their own forwarding tables accordingly, comprising the distributed aggregating router keys and optional key indexes which will be used to forward incoming data packets, thereby creating a useful forwarding architecture in the network. By using aggregating router keys, excessively large forwarding tables can thus be avoided as explained above. The forwarding operation in a router based on an aggregating router key will be described in more detail later below.

The distribution of router keys, associated aggregation related instructions and optional key indexes may be executed in a configuration process or otherwise, e.g. using a routing protocol such as when configuring a conventional forwarding architecture in a router domain as described above. The routers can then configure their forwarding tables with entries comprising different ingress and egress keys and outgoing ports, based on the distributed information. A distributed router key may in fact include a pair of ingress and egress keys.

End-host A intends to communicate with a target end-host and at some point, in a next step 4:5, accordingly sends an address query or similar to the key manager 400, e.g. referring to an e-mail address or web address of the target end-host in a conventional manner such as described above. Key manager 400 may then apply a policy defined for the target end-host, to determine if the querying end-host is authorised to send data packets to the target end-host or not.

Assuming that end-host A is authorised and can be allowed to send packets to the target end-host, the key manager 400 retrieves the destination key associated with the target end-host and creates a sender key from the destination key by applying a key derivation function KDF to at least the destination key and optionally also to other data such as the identity of the querying end-host, a time stamp, and/or a random number used for randomisation, often referred to as "RAND" or "NONCE". This can be expressed as:

$$\text{Sender\_key} = \text{KDF}(\text{Destination\_key}, <\text{other data}>) \quad (2)$$

If the identity of the querying end-host is used as "other data" in (2), the sender key will be uniquely associated with that end-host. KDF may preferably be a cryptographic function or the like.

In a further step 4:6, key manager 400 then provides the sender key to end-host A, in response to the query of step 4:5, such that end-host A can derive a sender tag therefrom and send data packets to the target end-host with the sender tag attached as ingress tag. The access router to which end-host A is connected should also be able to access the same sender key in order to perform a matching operation on the ingress tag, which is however not considered in this description.

End-host A thus applies a predefined first tag derivation function TDF to at least the received sender key, to create a sender tag "TAG" which is inserted as egress tag in a packet which is transmitted in a next step 4:7. The egress tag can be inserted in the destination field in the packet header, just as the destination IP address would be conventionally according to the prior art.

Depending on the implementation, the TDF may also be applied to "other data" such as payload data contained in the packet to be sent, a time stamp, and/or to a RAND or NONCE used for randomisation. This can be expressed as:

$$\text{Sender\_tag} = \text{TDF}(\text{Sender\_key}, <\text{other data}>) \quad (3)$$

If payload in the packet is comprised in the "other data", the sender tag will be unique for that packet only. TDF may be a cryptographic function or the like. End-host A may have been preconfigured to use TDF when transmitting data packets, or TDF may be submitted to end-host A together with the sender key in step 4:6. Furthermore, TDF is also known in the network, at least to the access router of end-host A.

Attaching the sender tag to a transmitted data packet will effectively authorise that packet to be routed towards its destination through the network. If a router detects that a received data packet does not contain any valid tag, the packet cannot be authorised and may simply be discarded. Thus, any attempt to attach a fake sender tag to a packet will most likely be unsuccessful if the TDF is a "strong" cryptographic function, and any packet with a non-valid tag attached will effectively be stopped in the forwarding process.

In a further step 4:8, the data packet originally sent from end-host A is received by an ingress part 402a at router 402. An ingress tag "TAG" is attached to the received packet, and optionally also an ingress key index, if used. The packet may be received from a previous router, not shown, or directly from end-host A if router 402 is A's access router. A forwarding unit 402b at router 402 is generally configured to perform a forwarding operation for each incoming data packet by means of a forwarding table schematically shown in forwarding unit 402b, in order to find an outgoing port in an egress unit 402c.

In a further step 4:9, forwarding unit 402b executes a matching operation for the attached "TAG" and different ingress keys IK in the forwarding table, using a known TDF, in order to find a matching entry in the table. In other words, forwarding unit 300b tries to match the received ingress tag with an ingress key IK for one entry at a time in the table.

In more detail, the matching operation may include that the router applies the TDF to a "candidate" ingress key in a row of the forwarding table to derive a candidate ingress tag. If the candidate ingress tag satisfies a predetermined relation with the received ingress tag in the packet, a match is considered to be found. The predetermined relation may be equality, i.e. a match is considered to be found if the candidate ingress tag is identical to the ingress tag in the packet. If the two tags do not match, the next candidate key in the table is tried, and so forth.

If an ingress key index IKi was included in the received packet, it is only necessary to perform the matching operation to the one or more entries in the table that contains that ingress key index IKi. Using an ingress key index IKi will thus effectively speed up the matching operation for each received data packet by limiting the number of potential candidate ingress tags in the table. It is also possible to only use an included ingress key index IKi to find the proper port, i.e. without performing the matching operation for security.

It should be noted that when aggregated router keys are used but not key indexes, it may be useful to populate the entries of a router's table with keys corresponding to high (or higher) levels of aggregation in the same order by which the router performs a sequential search in the table for a match. Thereby, a matching table entry can be found as early as possible.

If a matching entry is found in step 4:9, the port in that entry, in this case port P(x), is determined as the proper outgoing port for the packet, in a following step 4:10. If no matching entry is found in step 4:9, the packet is not authorised and will therefore be discarded in step 4:10, thereby stopping any such packets from being forwarded in this router. The matching operation of step 4:9 will thus authorise the packet for further routing.

Since router 402 employs aggregation of multiple destinations, its forwarding table comprises an aggregation related instruction associated with each aggregating router key in the table, which is read from a policy field in the table, such as in column 210 in FIG. 2a. In this case, the matching table entry contains an aggregation related instruction and forwarding unit 402b thus creates a new egress tag for the packet based on that instruction, in a next step 4:11. This can be done according to any of the embodiments described with reference to FIGS. 3a-c above, thus either exchanging the received tag for a new tag together with associated aggregation information when a hierarchical key scheme is used, or adding/removing an additional tag to/from the received tag when combined tags are used.

Another tag derivation function TDF' may also be applied to an egress key EK found in the matching entry, to obtain a new additional or exchanged tag. The TDF' should be known by the next-hop router to enable a matching operation therein. TDF and TDF' may be different or equal functions. The new egress tag TAG' can thus be expressed as:

$$\text{Egress\_tag} = \text{TDF'}(\text{Egress router\_key}, <\text{other data}>) \quad (4)$$

The "other data" in (4) may be payload data contained in the packet, and/or a RAND or NONCE used for randomisation. The new combined or exchanged egress tag is attached to the packet in a further step 4:12.

If key indexing is used, an egress key index EKi found in the matching entry is also attached to the packet in step 4:11. The attached EKi will then be used in the next-hop router as ingress key index IKi to find the relevant row(s) in its forwarding table for executing the matching operation, and so forth.

According to the matching table entry, the packet is then forwarded to port P(x) of the egress unit 402c, in a following step 4:13. Finally, the packet with the new egress tag TAG' attached is sent out on port P(x) as the next hop, in a last step 4:14. The next-hop router will then be able to match the new ingress tag TAG' with entries in its forwarding table to determine the next hop, basically in the same fashion as described above.

Figure 5:
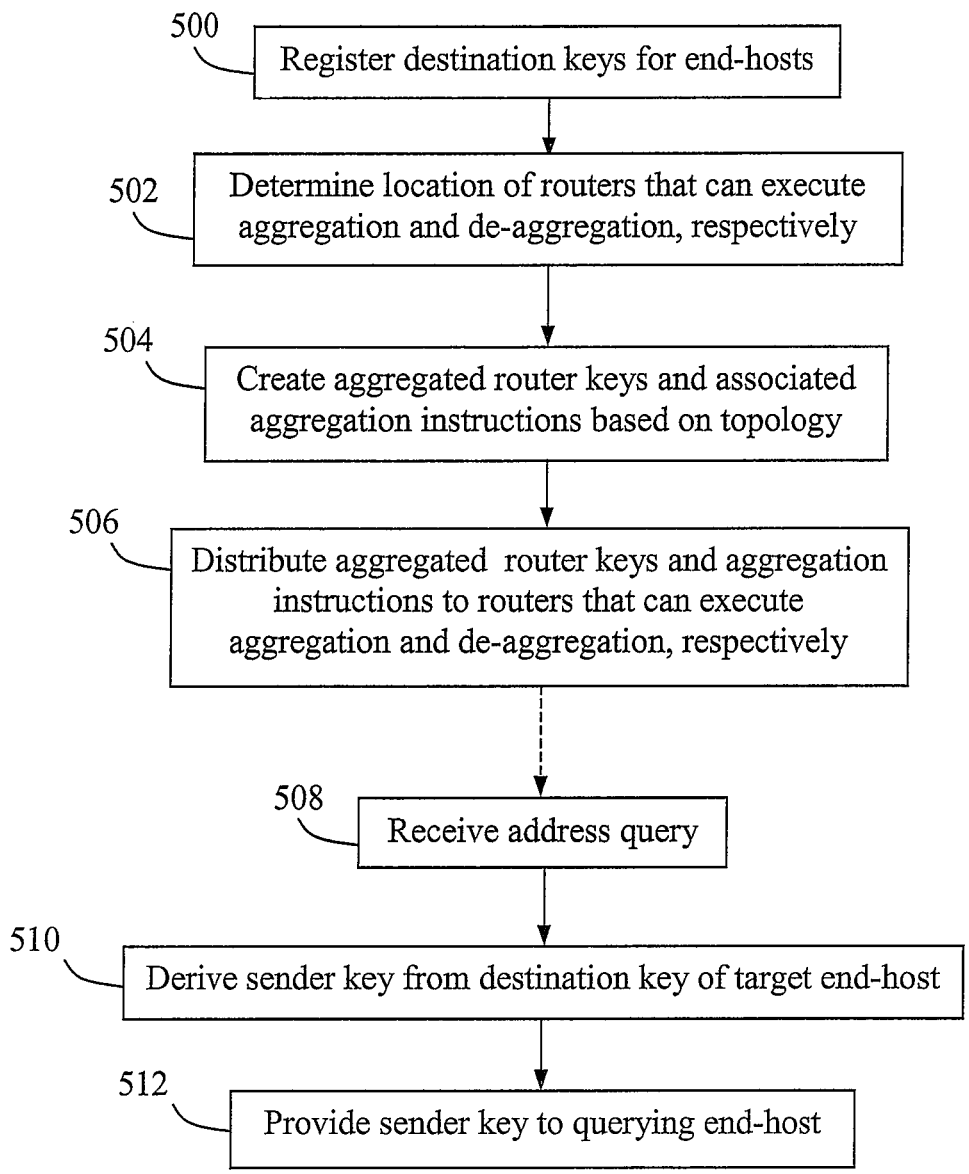
FIG. 5 is a flow chart with steps in a procedure performed by a key manager to support a forwarding process for data packets in routers of a packet-switched network, according to yet another embodiment.

FIG. 5 is a flow chart with steps in an exemplary procedure to support a forwarding process for data packets in routers of a packet-switched network, as executed by a key manager, e.g. the key manager 400 in FIG. 4. In a first step 500, destination keys are registered for different end-hosts connected to access routers in the network, e.g. as explained above for step 4:1 of FIG. 4. In a next step 502, it is determined the location of routers in the network that can execute route aggregation and de-aggregation, respectively, e.g. as in step 4:2 of FIG. 4.

In a further step 504, aggregating router keys and associated aggregation related instructions are created based on the determined placement of aggregation and de-aggregation, each aggregating router key generally representing a set of plural destinations, e.g. as in step 4:3 of FIG. 4. In a next step 506, the aggregating router keys and associated aggregation related instructions above are distributed to the routers that can execute route aggregation and de-aggregation, respectively, e.g. as in step 4:4 of FIG. 4. Thereby, these routers are enabled to configure their own forwarding tables from the distributed information. Non-aggregating router keys and destination keys may also be distributed to some of the routers, which is however not considered in this description. Steps 500-506 could be executed in a configuration procedure or otherwise.

In a further step 508, an address query is received at some point from a querying end-host, basically requesting a destination address or similar of a target end-host. The address query can be made in a conventional manner such as described above, e.g. referring to an e-mail address or web address of the target end-host. In a next step 510, a sender key is created by applying a key derivation function KDF to at least a destination key associated with the target end-host, or to a key related to said destination key.

In a final step 512, the key manager provides the sender key to the querying end-host derived from a destination key associated with the target end-host. It may also be checked whether the querying end-host is authorised to send data packets to the target end-host. If not, the query may simply be rejected. Thereby, the querying end-host is able to get across data packets to the target end-host by attaching a sender tag derived from the received sender key to each transmitted packet, basically in the manner described above for step 4:7.

Figure 6:
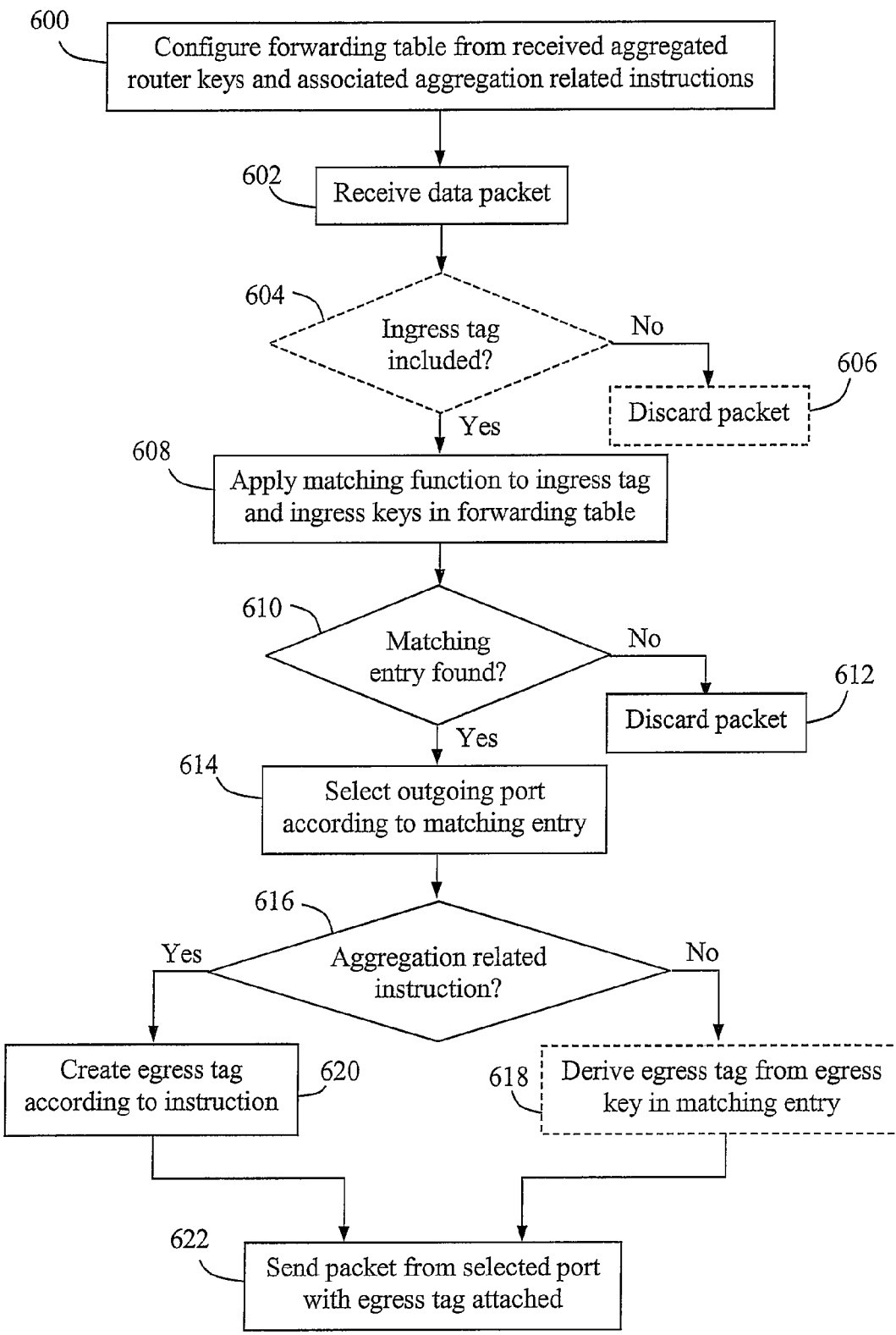
FIG. 6 is a flow chart with steps in a procedure performed by a router in a packet-switched network for executing a forwarding process for a data packet, according to yet another embodiment.

FIG. 6 is a flow chart with steps in an exemplary procedure for supporting a forwarding process for received data packets in a router of a packet-switched network, e.g. the router 402 in FIG. 4. In a first step 600, a forwarding table is configured from aggregating router keys and associated aggregation related instructions received from a key manager, e.g. a DNS system, as in step 4:4 of FIG. 4.

In a next step 602, a data packet is received by the router. The packet may have been transmitted either from a neighbouring router, or from a sending end-host as the first hop if the router is an access router for the sending end-host, e.g. as in hop 3:1 in FIG. 4. In an optional next step 604, it may be checked whether the packet contains an ingress tag derived from a key that the key manager has provided. If no such ingress tag is found, the packet could be discarded at this point in a further step 606.

On the other hand, if the packet contains an ingress tag, a matching operation is applied to the received ingress tag and different candidate ingress keys in the forwarding table, e.g. using a known TDF as described above for step 4:9 in FIG. 4, in a following step 608, in order to find a matching entry in the table. If key indexing is used in the forwarding table and a key index is also attached to the received packet, the key index can be used in this step to limit the matching operation to one entry or just a few entries in order to rapidly find a matching entry in the table.

In a next step 610, it is determined whether a matching entry is found in the forwarding table by means of the matching operation. If not, the packet is discarded in a step 612. If a matching entry is found, an outgoing port is selected for the packet according to the matching entry, in a further step 614.

In a following step 616, it is further checked whether an aggregation related instruction is present in the matching table entry, which is thus associated with the ingress key in the matching table entry, basically instructing the router to execute either aggregation or de-aggregation. If present, the aggregation related instruction may thus dictate that the received tag should be changed, or that one or more router tags should be added or removed to/from the packet, respectively, according to any of the embodiments described for FIGS. 3*a-c* above.

If no such aggregation related instruction is found in the entry, a new egress tag may be derived by applying a tag derivation function to an egress key in the matching table entry, in an optional step 618. Alternatively, the received tag may be reused as egress tag when sending the packet to the next hop router.

On the other hand, if an aggregation related instruction is present in the matching table entry, a new egress tag is created according to that instruction, in a further step 620. Finally, the packet is sent to the next hop router from the determined port with the new egress tag attached, in a last shown step 622. If key indexing is used, an egress key index in the matching table entry may also be attached to the packet. The receiving next hop node is then able to basically repeat the procedure according to steps 600-622 above.

Figure 7:
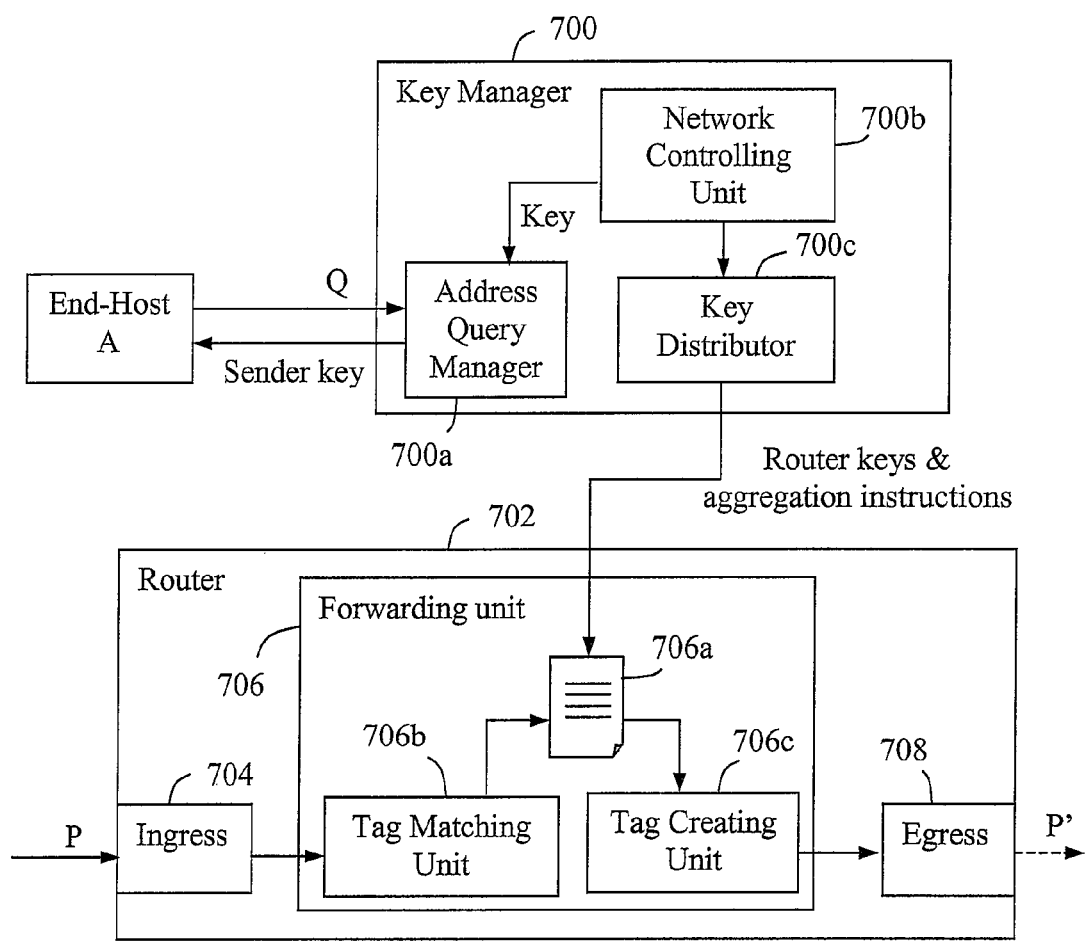
FIG. 7 is a schematic block diagram illustrating a key manager and a router in a packet-switched network in more detail, according to further embodiments.

FIG. 7 is a logic block diagram illustrating in more detail an apparatus in a key manager 700 and an arrangement in a router 702 in a packet-switched network, for supporting the forwarding of data packets in the network, in accordance with further exemplary embodiments.

Key manager 700 comprises a network controlling unit 700*b* adapted to register destination keys for end-hosts connected to access routers in the network. The network controlling unit 700*b* is further adapted to determine the location of routers in the network that can execute route aggregation and de-aggregation, respectively, e.g. based on a forwarding table size, a hierarchical network structure, the location of end-hosts, etc.

Key manager 700 also comprises a key distributor 700*c* adapted to create aggregating router keys and associated aggregation instructions, each aggregating router key representing a set of plural destinations. Key distributor 700*c* is further adapted to distribute the aggregating router keys and associated aggregation instructions to the routers that can execute route aggregation and de-aggregation, thereby enabling the routers to configure their own forwarding tables.

Network controlling unit 700*b* may also hold information indicating which end-hosts are authorised to send packets to each registered end-host. This information may comprise policies defined for the registered end-hosts and determining if a querying end-host is authorised to send data packets to a particular destination.

The key manager 700 further comprises an address query manager 700*a* adapted to receive an address query from a querying end-host A regarding a target end-host, not shown. The address query manager 700a is also adapted to create a sender key by applying a key derivation function KDF to at least a destination key associated with the target end-host or to a key related to said destination key, and to send the created sender key to the querying end-host in response to the address query. Thereby, the querying end-host is able to get across data packets to the target end-host by attaching a sender tag generated from the sender key to a transmitted data packet, the sender tag directing the transmitted data packet to the target end-host.

The router 702 comprises an ingress part 704 adapted to receive a data packet P from a neighbouring node such as another router in the network, or directly from a sending end-host. The ingress part 704 may be further adapted to admit the packet if a valid ingress tag is attached to the packet, and to otherwise discard the packet if not including a valid ingress tag.

The router 702 also comprises a forwarding unit 706 adapted to configure a forwarding table from aggregating router keys and associated aggregation related instructions received from key distributor 700c in the key manager 700. Forwarding unit 706 also comprises a forwarding table 706a and a tag matching unit 706b for matching the received ingress tag with ingress keys in entries of the forwarding table 706a, to determine an outgoing port for the packet from a matching table entry, e.g. in the manner described for steps 4:9-4:10 in FIG. 4 and steps 608-614 in FIG. 6, respectively.

The forwarding unit 706 further includes a tag creating unit 706c adapted to create an egress tag for the packet according to an aggregation related instruction present in a matching table entry. The router 702 also comprises an egress part 708 adapted to send the packet to a next hop node, e.g. another neighbouring router, from the determined outgoing port with the created new egress tag attached to the packet.

It should be noted that FIG. 7 merely illustrates various functional units in the key manager 700 and router 702, respectively, in a logical sense. However, the skilled person is free to implement these functions in practice using any suitable software and hardware means. Thus, the present invention is generally not limited to the shown structure of the key manager 700 and router 702.

In this solution, a router can thus match an ingress tag included in a received data packet with routing or ingress keys in the forwarding table, in the manner described above, to verify the packet and, at the same time find the correct outgoing port. If a match is found in an entry of the forwarding table, the port number in that entry is determined to be the correct outgoing port for the packet.

The described embodiments enable a forwarding architecture where scalable forwarding tables can be used in routers. The routing of data packets can also be controlled to avoid flooding, spamming, virus, fraud, DoS attacks and generally unsolicited traffic. While the invention has been described with reference to specific exemplary embodiments, the description is generally only intended to illustrate the inventive concept and should not be taken as limiting the scope of the invention. The present invention is defined by the appended claims.

The invention claimed is:

1. A method of forwarding received data packets through a packet-switched network, comprising:

configuring, in a router, a forwarding table based on aggregating router keys and aggregation instructions associated with the aggregating router keys received from a key manager, each aggregating router key representing a set of destinations, the forwarding table comprising at least one table entry and each of the at least one table entries comprising a candidate ingress key, an egress key, key index, an outgoing port indication, and an aggregation instruction;

receiving a data packet comprising an ingress tag;

applying a mathematical function, matching the ingress tag in the received data packet with the candidate ingress key of the at least one table entry in the forwarding table to find a matching table entry;

if a matching table entry is found, selecting as an outgoing port to forward the received data packet the outgoing port corresponding to the outgoing port indication of the matching table entry;

creating an egress tag according to the egress key or the aggregation instruction of the matching table entry;

attaching the key index of the matching table entry and the created egress tag to the received data packet; and forwarding the received data packet attached with the created egress tag using the selected outgoing port to another router.

2. The method according to claim 1, wherein the mathematical function includes applying a tag derivation function to the candidate ingress key of a table entry of the forwarding table to derive a candidate ingress tag, and wherein a match is considered to be found if the candidate ingress tag satisfies a predetermined relation with the ingress tag of the received data packet.

3. The method according to claim 2, wherein the predetermined relation is equality, and a match is thereby considered to be found if the candidate ingress tag is identical to the ingress tag of the received data packet.

4. The method according to claim 1, wherein creating the egress tag comprises applying a tag derivation function to the egress key of the matching table entry.

5. The method according to claim 1, wherein the received data packet further comprises a key index associated with an entry or a set of entries of the at least one entry in the forwarding table for applying the mathematical function.

6. The method according to claim 1, wherein creating the egress tag comprises attaching one or more sub-tags, derived from one or more egress keys in the matching table entry, to the received data packet to execute aggregation, or by removing one or more sub-tags from the received data packet to execute de-aggregation.

7. The method according to claim 6, wherein creating the egress tag further comprises applying a predetermined combination function to the ingress tag of the received data packet and the one or more sub-tags when executing aggregation.

8. The method according to claim 7, wherein the predetermined combination function is concatenation or an XOR function.

9. The method according to claim 1, wherein a hierarchical scheme of router keys and destination keys is used wherein creating the egress tag comprises exchanging the ingress tag of the received data packet for a new tag derived from an egress key in the matching table entry and adding aggregation information to the egress tag, wherein the aggregation information can be used to determine the original destination.

10. The method according to claim 9, wherein the hierarchical router key scheme has a tree-structure iteratively generated from;

a root router key value;

a router key value of a node position above a current tree level; and an integer indicating a node position within the current tree level;

wherein destination keys of end-hosts correspond to leaves of the tree-structure, and any router key values on tree levels above the leaves can be used as aggregating router keys.

11. The method according to claim 10, wherein the resulting key scheme is composed of key values that can be calculated, by applying a recursive function to the root router key value.

12. An apparatus in a router of a packet-switched network for forwarding received data packets, comprising:
   an ingress unit configured to receive a data packet comprising an ingress tag derived from a sender key or router key,
   a forwarding unit configured to configure a forwarding table based on aggregating router keys and aggregation instructions associated with the aggregating router keys received from a key manager, each aggregating router key representing a set of destinations, the forwarding table comprising at least one table entry and each of the at least one table entries comprising a candidate ingress key, an egress key, key index, an outgoing port indication, and an aggregation instruction, the forwarding unit comprising:
      a tag matching unit configured to:
         apply a mathematical function matching the ingress tag in the received data packet with the candidate ingress key of the at least one table entry in the forwarding table to find a matching table entry; and
         if a matching table entry is found, select as an outgoing port to forward the received data packet the outgoing port corresponding to the outgoing port indication of the matching table entry; and
      a tag creating unit configured to:
         create an egress tag according to the egress key or the aggregation instruction of the matching table entry; and
         attach the key index of the matching table entry and the created egress tag to the received data packet; and
   an egress unit configured to forward the received data packet attached with the created egress tag using the selected outgoing port to another router.

13. The apparatus according to claim 12, wherein the tag matching unit is further configured to apply a tag derivation function to the candidate ingress key of a table entry of the forwarding table to derive a candidate ingress tag, and wherein a match is considered to be found if the candidate ingress tag satisfies a predetermined relation with the ingress tag of the received data packet.

14. The apparatus according to claim 13, wherein the predetermined relation is equality, and a match is thereby considered to be found if the candidate ingress tag is identical to the ingress tag of the received data packet.

15. The apparatus according to claim 12, wherein the tag creating unit is configured to create the egress tag by applying a tag derivation function to the egress key of the matching table entry.

16. The apparatus according to claim 12, wherein the tag creating unit is configured to create the egress tag by attaching one or more sub-tags, derived from one or more egress keys in the matching table entry, to the received data packet to execute aggregation, or by removing one or more additional sub-tags from the received data packet to execute de-aggregation.

17. The apparatus according to claim 16, wherein the tag creating unit is configured to create the egress tag by applying a predetermined combination function to the ingress tag of the received data packet and the one or more sub-tags when executing aggregation.

18. The apparatus according to claim 17, wherein the predetermined combination function is concatenation or an XOR function.

19. The apparatus according to claim 12, wherein a hierarchical scheme of router keys and destination keys is used wherein the tag creating unit is configured to create the egress tag by exchanging the ingress tag of the received data packet for a new tag derived from an egress key in the matching table entry and adding aggregation information to the egress tag, wherein the aggregation information can be used to determine the original destination.

20. The apparatus according to claim 19, wherein the hierarchical router key scheme has a tree-structure iteratively generated from:
   a root router key value;
   a router key value of a node position above a current tree level; and
   an integer indicating a node position within the current tree level;
   wherein destination keys of end-hosts correspond to leaves of the tree-structure, and any router key values on tree levels above the leaves can be used as aggregating router keys.

21. The apparatus according to claim 20, wherein the resulting key scheme is composed of key values that can be calculated, along a path from by applying a recursive function to the root router key value.

22. A method performed by a key manager for supporting routers in a packet-switched network, comprising:
   registering destination keys for end-hosts;
   determining one or more aggregating routers;
   creating aggregation information comprising aggregating router keys and aggregation instructions associated with the aggregating router keys, each aggregating router key representing a set of destinations;
   distributing the aggregation information to the one or more aggregating routers thereby enabling the one or more aggregating routers to configure their forwarding tables based on the aggregation information;
   receiving an address query from a querying end-host regarding a target end-host;
   creating a sender key by applying a key derivation function to at least a destination key associated with the target end-host; and
   sending the created sender key to the querying end-host in response to the address query, thereby enabling the querying end-host to attach a sender tag generated from the sender key to a data packet to be transmitted, the sender tag directing the data packet to the target end-host;
   wherein each end-host is connected to the packet-switched network via an access router;
   wherein the access router is one of the routers in the packet-switched network; and
   wherein the one or more aggregating routers are routers in the packet-switched network and are configured to execute at least one of route aggregation and de-aggregation.

23. An apparatus in a key manager for supporting at routers in a packet-switched network, comprising:
   a network controlling unit configured to;
      register destination keys for end-hosts; and
      determine of one or more aggregating routers;
   a key distributor configured to:

create aggregation information comprising aggregating router keys and aggregation instructions associated with the aggregating router keys, each aggregating router key representing a set of destinations; and distribute the aggregation information inctruction to the one or more aggregating routers, thereby enabling the one or more aggregating routers to configure their forwarding tables based on the aggregation information;

an address query manager configured to:

receive an address query from a querying end-host regarding a target end-host;

create a sender key by applying a key derivation function to at least a destination key associated with the target end-host; and send the created sender key to the querying end-host in response to the address query, thereby enabling the querying end-host to attach a sender tag generated from the sender key to a data packet to be transmitted, the sender tag directing the data packet to the target end-host;

wherein each end-host is connected to the packet-switched network via an access router;

wherein the access router is one of the routers in the packet-switched network; and wherein the one or more aggregating routers are routers in the packet-switched network and are configured to execute at least one of route aggregation and de-aggregation.

* * * * *

UNITED STATES PATENT AND TRADEMARK OFFICE
CERTIFICATE OF CORRECTION

PATENT NO. : 8,665,874 B2  
APPLICATION NO. : 13/128012  
DATED : March 4, 2014  
INVENTOR(S) : Czászár et al.

Page 1 of 1

It is certified that error appears in the above-identified patent and that said Letters Patent is hereby corrected as shown below:

On the Title Page, Item (12), under "United States Patent", in Column 1, Line 1, delete "Czaszar" and insert -- Császár --, therefor.

On the Title Page, Item (75), under "Inventors", in Column 1, Line 1, delete "Andras Czaszar," and insert -- András Császár, --, therefor.

On the Title Page, Item (75), under "Inventors", in Column 1, Line 3, delete "Naslund," and insert -- Näslund, --, therefor.

In the Claims

In Column 25, Lines 6-7, in Claim 11, delete "calculated," and insert -- calculated --, therefor.

In Column 26, Line 30, in Claim 21, delete "calculated, along a path from by" and insert -- calculated by --, therefor.

In Column 26, Line 41, in Claim 22, delete "aggregating routers" and insert -- aggregating routers, --, therefor.

In Column 26, Line 62, in Claim 23, delete "supporting at" and insert -- supporting --, therefor.

In Column 26, Line 66, in Claim 23, delete "determine of" and insert -- determine --, therefor.

In Column 27, Line 5, in Claim 23, delete "information inctructions" and insert -- information --, therefor.

Signed and Sealed this  
Second Day of September, 2014

Michelle K. Lee  
*Deputy Director of the United States Patent and Trademark Office*